United States Patent
Subramanian et al.

(10) Patent No.: US 12,327,207 B2
(45) Date of Patent: *Jun. 10, 2025

(54) SYSTEMS AND METHODS FOR DRONES AS A SERVICE

(71) Applicant: DISH Network L.L.C., Englewood, CO (US)

(72) Inventors: Prakash Subramanian, Littleton, CO (US); Nicholas Newell, Centennial, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/589,927

(22) Filed: Feb. 28, 2024

(65) Prior Publication Data

US 2024/0257004 A1 Aug. 1, 2024

Related U.S. Application Data

(63) Continuation of application No. 17/064,123, filed on Oct. 6, 2020, now Pat. No. 11,934,981.

(51) Int. Cl.
*G06Q 10/0631* (2023.01)
*B64U 10/14* (2023.01)
(Continued)

(52) U.S. Cl.
CPC ..... *G06Q 10/06315* (2013.01); *G06Q 10/083* (2013.01); *G06Q 20/3278* (2013.01);
(Continued)

(58) Field of Classification Search
CPC .......... G06Q 10/06315; G06Q 10/083; G06Q 20/3278; G06Q 20/4014; G06Q 20/3825;
(Continued)

(56) References Cited

U.S. PATENT DOCUMENTS 6,690,997 B2   2/2004   Rivalto
8,511,606 B1   8/2013   Lutke et al.
(Continued)

FOREIGN PATENT DOCUMENTS

KR   101780479 B1   10/2017
WO   2016154948 A1   10/2016

OTHER PUBLICATIONS

Ivancic, William D., et al. "Flying drones beyond visual line of sight using 4g LTE: Issues and concerns." 2019 Integrated Communications, Navigation and Surveillance Conference (ICNS). IEEE, 2019. (Year: 2019).*

(Continued)

*Primary Examiner* — Sharad Rampuria
(74) *Attorney, Agent, or Firm* — Perkins Coie LLP

(57) ABSTRACT

A technique is described for implementing drones as a service. As an example, a drone may receive instructions from one or more network elements, coordinate operations with the one or more network elements, and perform at least one task associated with the instructions. The drone may deliver a container to a first location and perform object recognition to validate an object of a subscriber being delivered to a second location. The drone may measure the weight and dimensions of the object to confirm the object is within operating guidelines. After verifying the object is within operating guidelines, the drone may transport the container containing the object to the second location.

20 Claims, 8 Drawing Sheets

(51) Int. Cl.

| | | |
|---|---|---|
| *B64U 101/25* | (2023.01) | |
| *B64U 101/64* | (2023.01) | |
| *G06Q 10/083* | (2024.01) | |
| *G06Q 20/32* | (2012.01) | |
| *G06Q 20/40* | (2012.01) | |
| *G06V 20/10* | (2022.01) | |
| *G06V 40/16* | (2022.01) | |
| *G06V 40/20* | (2022.01) | |
| *G10L 17/06* | (2013.01) | |
| *H04L 9/40* | (2022.01) | |

(52) U.S. Cl.
CPC ......... *G06Q 20/4014* (2013.01); *G06V 20/10* (2022.01); *G06V 40/174* (2022.01); *G06V 40/20* (2022.01); *G10L 17/06* (2013.01); *H04L 63/0861* (2013.01); *B64U 10/14* (2023.01); *B64U 2101/25* (2023.01); *B64U 2101/64* (2023.01)

(58) Field of Classification Search
CPC ............. G06Q 20/085; G06Q 20/4015; G06Q 30/0185; G06V 20/10; G06V 40/174; G06V 40/20; G10L 17/06; G10L 17/00; H04L 63/0861; B64U 2101/60; H04B 7/18504; H04W 12/069; H04W 12/63; H04W 12/65; H04W 12/68; H04W 12/08
See application file for complete search history.

(56) References Cited

U.S. PATENT DOCUMENTS

| | | | |
|---|---|---|---|
| 9,346,560 | B2 | 5/2016 | Wang |
| 9,384,668 | B2 | 7/2016 | Raptopoulos |
| 9,387,928 | B1 | 7/2016 | Gentry et al. |
| 9,558,673 | B2 | 1/2017 | Soundararajan et al. |
| 9,589,448 | B1 | 3/2017 | Schneider et al. |
| 9,760,087 | B2 | 9/2017 | Hoareau et al. |
| 9,777,502 | B2 | 10/2017 | Curlander et al. |
| 9,849,979 | B2 | 12/2017 | Peeters et al. |
| 10,410,291 | B1 | 9/2019 | Binion et al. |
| 11,242,143 | B2 * | 2/2022 | Michini ............... G05D 1/0033 |
| 11,475,470 | B2 * | 10/2022 | Bronicki ............... H04W 4/35 |
| 2014/0018976 | A1 | 1/2014 | Goossen et al. |
| 2015/0158599 | A1 | 6/2015 | Sisko |
| 2015/0266577 | A1 | 9/2015 | Jones |
| 2016/0246297 | A1 | 8/2016 | Song |
| 2016/0357183 | A1 | 12/2016 | Shaw |
| 2016/0364989 | A1 | 12/2016 | Speasl et al. |
| 2017/0023939 | A1 | 1/2017 | Krouse et al. |
| 2017/0090484 | A1 | 3/2017 | Obaidi |
| 2017/0220979 | A1 | 8/2017 | Vaananen |
| 2017/0228692 | A1 | 8/2017 | Pargoe |
| 2017/0358212 | A1 | 12/2017 | Godwin et al. |
| 2018/0265194 | A1 | 9/2018 | Gauglitz |
| 2019/0035282 | A1 | 1/2019 | Ferguson |
| 2019/0047695 | A1 | 2/2019 | Boudville |
| 2019/0103030 | A1 * | 4/2019 | Banga ............... G01S 5/0027 |
| 2019/0332974 | A1 | 10/2019 | Karatekeli et al. |
| 2019/0369641 | A1 | 12/2019 | Gillett |
| 2021/0142231 | A1 | 5/2021 | Karatekeli et al. |
| 2022/0108244 | A1 | 4/2022 | Subramanian |
| 2023/0050191 | A1 | 2/2023 | Karatekeli et al. |
| 2024/0127133 | A1 | 4/2024 | Karatekeli et al. |

OTHER PUBLICATIONS

Messous, Mohamed-Ayoub, et al., "Computation Offloading Game for an UAV Network in Mobile Edge Computing." 2017 IEEE International Conference on Communications (ICC). IEEE, 2017. (Year: 2017).

Boeing, "Boeing Base Station Concept Would Autonomously Refuel Military Drones", "https://www.popsci.com/boeing-has-patented-drone-battle-station", Feb. 12, 2018, p. 3.

Pixiepath, "New Start-Up Creating Drone Fleet Mgmt Platform", "https://unmanned-aerial.com/new-start-up-creating-drone-fleet-management-platform", Feb. 10, 2018, p. 1, Publisher: Pixiepath.

Azade Fotouhi, Ming Ding and Mahbub Hassan, "Service on Demand: Drone Base Stations Cruising in the Cellur Network", "https://arxiv.org/pdf/1710.09504.pdf", Oct. 26, 2017, p. 7.

Iiker, A.; "Regulating Commercial Drones: Bridging the Gap Between American and Europe Drone Regulations," 15 Journal of Intl. Business and Law; pp. 313-336 (25 pgs. total) (Year: 2016).

* cited by examiner

SYSTEMS AND METHODS FOR DRONES AS A SERVICE

CROSS-REFERENCE TO RELATED APPLICATION

This application is a continuation of U.S. patent application Ser. No. 17/064,123, entitled "SYSTEMS AND METHODS FOR DRONES AS A SERVICE," filed Oct. 6, 2020, the contents of which are hereby incorporated by reference in its entirety.

BACKGROUND

Presently, given the legal restrictions and privacy concerns around drones, it may not be economical for a consumer to own and operate drones. However, drones may be used in a variety of ways to aid consumers in performing tasks.

Figure 1:
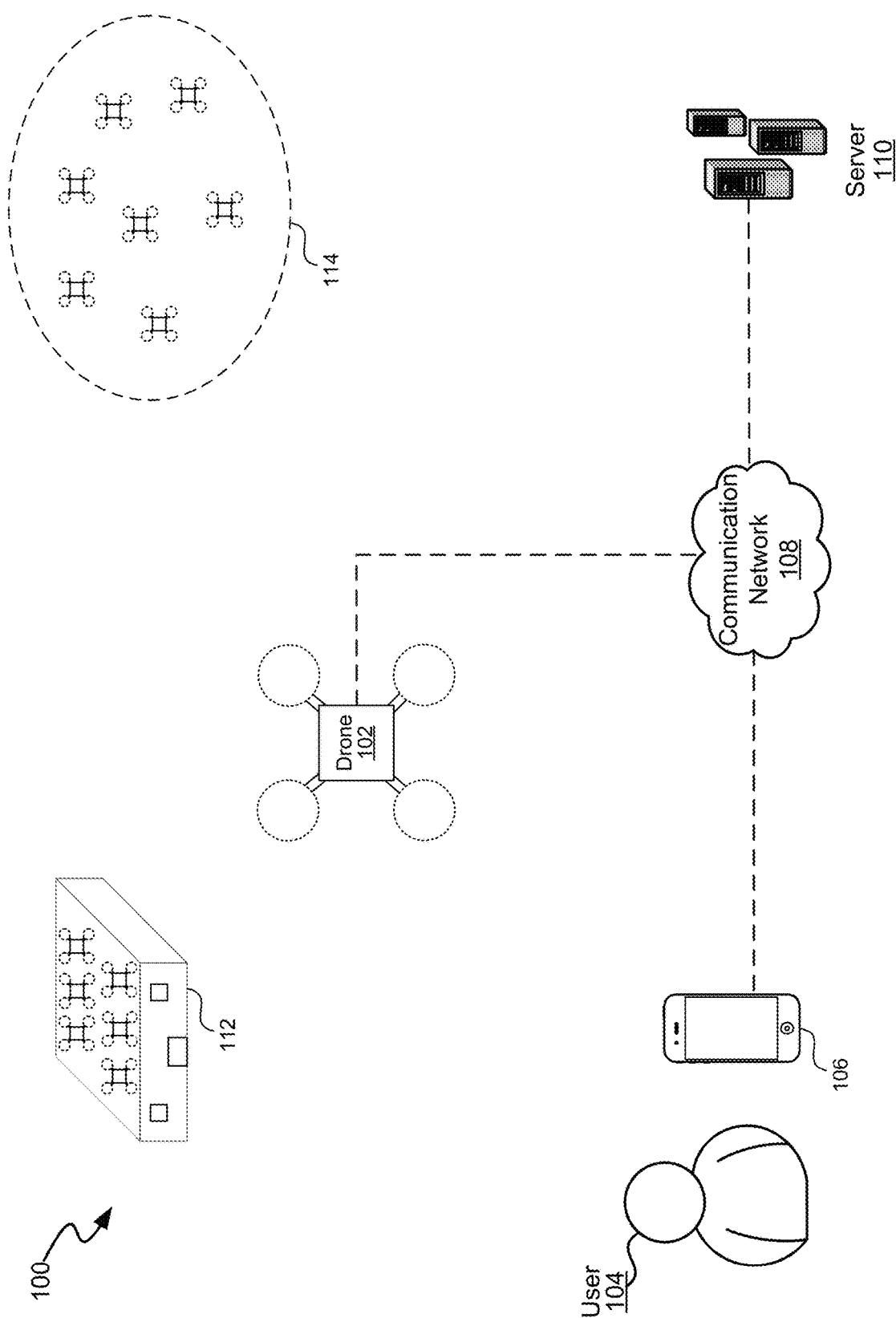
FIG. 1 is a schematic diagram showing a logical system architecture, in accordance with an embodiment.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Drones may be utilized to aid consumers in performing tasks. In an embodiment, a consumer may gesture, such as hand waving, to summon a drone for a task. In another embodiment, the consumer may use a mobile device to summon the drone. The drone may receive instructions from a network associated with the drone and coordinate operations with the mobile device based on the type of task. For example, the consumer may request a drone to complete a task (e.g., deliver a package or take a photo) with an application on a mobile device. In an embodiment, the consumer may provide access credentials to become authorized to have the drone perform the task and receive a confirmation from the network that a drone has been assigned to perform the task. The drone may arrive and perform the task at the designated location. In some instances, the drone may use facial recognition or vocal patterns to identify the consumer at the designated location. After identifying the consumer, the drone may perform the task.

In FIG. 1, a schematic diagram illustrates a logical system architecture 100. A user 104 (e.g., a subscriber, consumer, etc.) may use a mobile device 106 (e.g., smartphone, smartwatch, laptop, etc.) to communicate with drone 102 through communication network 108. Drone 102 may be associated with a fleet of drones which are available to be requested for services from an airborne location 114 or from a grounded location 112 (e.g., a roof of building). In an embodiment, the drones may fly designated flight patterns (e.g., 3-dimensional flight patterns in geofencing perimeters) until a task is assigned. In another embodiment, drones may hover above locations where tasks are frequently performed.

In an embodiment, user 104 may summon the drone 102 to perform a task with a gesture, such as a hand movement. In another embodiment, user 104 using mobile device 106 may request, from server 110, a drone to perform a task. In some implementations, once the user 104 summons or requests drone 102 for a service, a near-field communication (NFC) network may be setup for the nearby devices (phones, smartwatch, cars, etc.) to connect to the drone 102. Server 110 may request access credentials associated with user 104 to authorize a drone to perform the task. The access credentials may verify user 104 is a subscriber and authorized to have a drone assist them. Server 110 may assign drone 102 to perform the task associated with user 104. In some cases, mobile device 106 may send a location for the task to occur to server 110. User 104 may receive a confirmation that the drone 102 has been assigned. In an embodiment, the drone 102 may navigate to the location and perform the task. In an embodiment, the drone 102 may notify user 104 that the task is complete and initiate a payment transaction. In another embodiment, a transaction may take place before the task is complete. Examples of the task may include delivering food, delivering packages, taking a picture, babysitting children, periodic check up on persons participating in sporting activities, periodic check up on elderly people or pets, monitoring a package until it is picked up by the recipient, taking a video or picture of individuals at events, searching for missing persons, mobile hotspot, portable electric charging, emergency recovery of small pets during flooding, earthquakes, or fires, or validating the authenticity of a rental house listing, campsite or vacation home.

Figure 2:
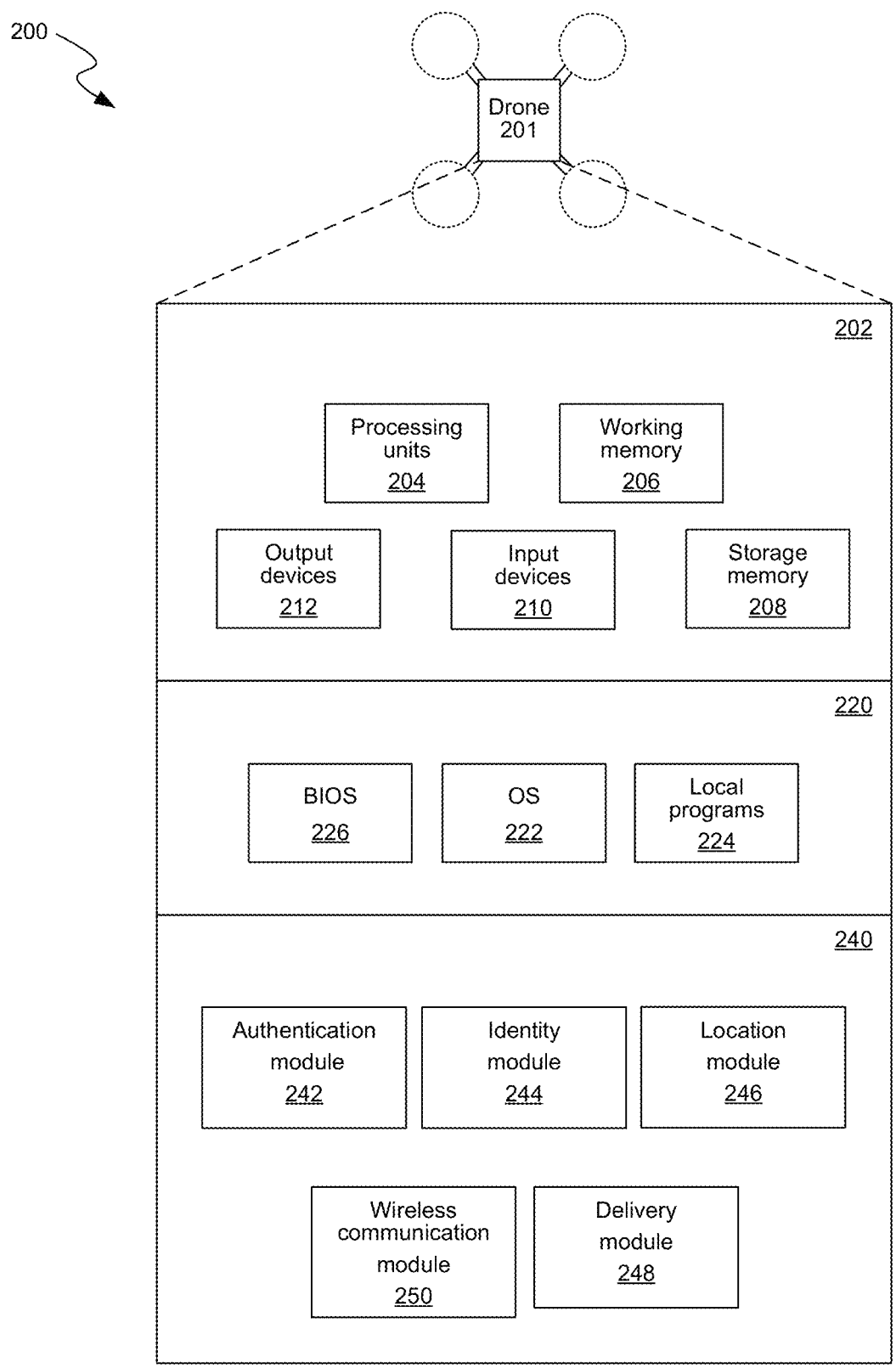
FIG. 2 is a schematic diagram showing the devices of a service drone, according to an embodiment.

FIG. 2 illustrates an embodiment of components of a drone 201 in a system 200. The components may include hardware 202, general software 220, and specialized components 240. A system implementing the disclosed technology can use various hardware, including processing units 204 (e.g., CPUs, GPUs, APUs, etc.), working memory 206, storage memory 208, and input devices 210 and output devices 212.

General software 220 can include various applications, including an operating system 222, local programs 224, and a basic input output system (BIOS) 226. Specialized components 240 can be subcomponents of a general software application 220, such as local programs 224. Specialized components 240 can include an authentication module 242, an identity module 244, a location module 246, a delivery module 248, a wireless communication module 250, and components that can be used for receiving and transferring data and controlling the specialized components. In some implementations, the components can be in a computing system that is distributed across multiple computing devices or can be an interface to a server-based application executing one or more of specialized components 240.

Authentication module 242 may be used to validate the subscriber is authorized to have the drone 201 complete a task. Drone 201 may use identity module 244 to identify the subscriber related to the task. Drone 201 may identify the subscriber by facial recognition, vocal patterns, or other demographics. In an embodiment, the identify module 244 may be used to identify the subscriber to charge for the service the drone provides. Once the subscriber is identified, the authentication module 242 can associate the subscriber to an account in the system and ensure that this account has been authorized to request the drone for a task (e.g., the subscriber has paid for the service). Alternatively, the subscriber may provide authorization by logging into an application on a device (e.g., a smartphone application). In another embodiment, the identity module 244 may be used to identify an item when drone 201 is performing a delivery service. Drone 201 may perform object recognition to confirm the item being delivered is correct.

In an embodiment, the drone 201 may measure the height and weight dimensions of the item to confirm the item is within operating guidelines for deliveries. Delivery module 248 may be used when the drone is performing a delivery service. Drone 201 may use location module 246 to navigate to the location to perform the task. The location (e.g., GPS location) may be provided by a device associated with the subscriber.

In an embodiment, drone 201 may use wireless communication module 250 to provide a subscriber with a hotspot wireless connection (e.g., 5G connection). In another embodiment, the drone 201 may provide temporary cellular coverage for a mobile device associated with a subscriber. For example, the drone 201 may fly outside a car and provide cellular coverage to a device when the car is in a tunnel.

Figure 3:
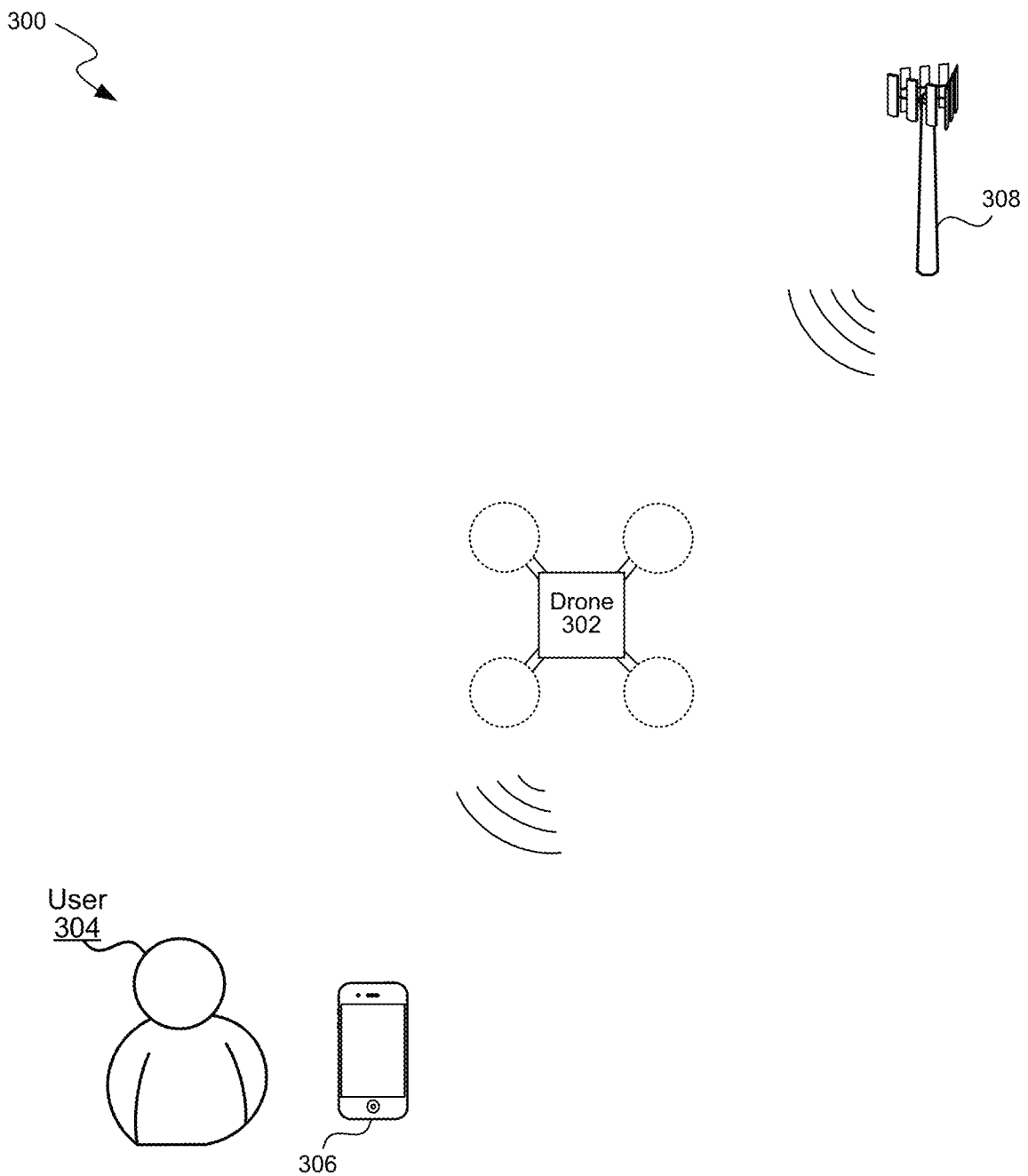
FIG. 3 is a schematic diagram showing the devices of a service drone, according to an embodiment.

FIG. 3 illustrates an embodiment of drone 302 in a system 300. In an embodiment user 304 using mobile device 306 may request drone 302 to serve as a relay between wireless communication source 308 (e.g., 5G network tower) and mobile device 306 (e.g., smartphone, laptop, augmented reality (AR) glasses, smartwatch, vehicle, etc.). Drone 302 may provide line of sight network coverage between mobile device 306 and the wireless communication source 308. For example, mobile device 306 may not have a line of sight to a cellular tower due to an obstruction, such as a building, hill, or tunnel. Drone 302 may assist in providing the network coverage by navigating to a location where drone 302 has a line of sight to both mobile device 306 and the cellular tower.

Drone 302 may provide a hotspot for subscribers. In an embodiment, a subscriber, such as user 304, may request for a 5G hotspot from drone 302 using gestures. In another embodiment, the subscriber may request the hotspot using mobile device 306. Drone 302 may respond to the request if drone 302 contains a 5G radio. In another embodiment, the drone 302 may fly to a location it can see both the device 306 and the nearest cell tower (e.g., wireless communication source 308), thus providing a line of sight for communication. In another embodiment, device 306 may be indoors or does not have a clear line of sight to the nearest cell tower. Device 306 may request drone 302 to provide network coverage at the location of poor or no coverage. However, drone 302 may not have a line of sight with the nearest cell tower and may request one or more other drones to assist in providing a line of sight. Drone 302 and the one or more other drones may coordinate to provide the network coverage to device 306. For example, drone 302 may be inside or near to an open window or door and another drone may be outside at a height where it can see both the drone 302 and nearest cell tower. In another embodiment, drone 302 may provide a temporary cell coverage inside a tunnel. In another embodiment, drone 302 may provide a network coverage to a device in a moving vehicle by flying in proximity to the vehicle. Drone 302 may assist in providing the network coverage according to 3GPP compliant standards.

In some implementations, the drone 302 may measure the signal quality (e.g., signal strength, signal to noise ratio, power level, etc.) of the relayed coverage and adjust positioning of drone 302 to improve the quality of the network coverage. For example, drone 302 may change positions, such as altering longitudinal, lateral or vertical orientation, to provide device 306 with a stronger network coverage. In other implementations, after providing a service, the drone 302 may document the signal quality at the location of the service. Other drones may reference the documented signal quality and location when determining a position to provide network coverage to a device.

Figure 4:
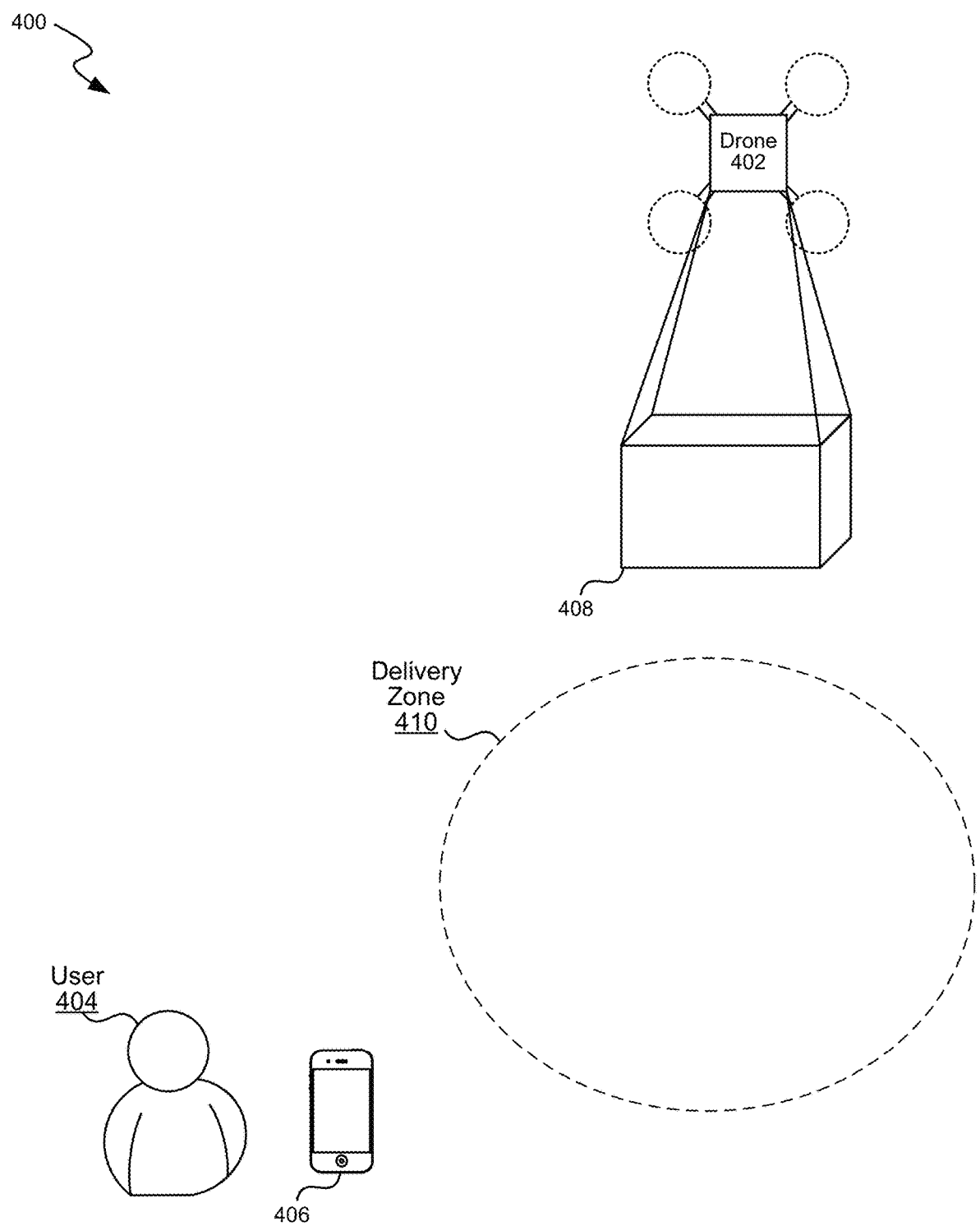
FIG. 4 is a schematic diagram showing the devices of a service drone, according to an embodiment.

FIG. 4 illustrates an embodiment of drone 402 in a system 400. In an embodiment, drone 402 may perform a delivery service from one location to another. Device 406 associated with user 404 may request drone 402 to deliver or pick up an item at a location, such as delivery zone 410. Drone 402 may transport a container 408 (e.g., box, net, or bag) that holds the item to be delivered. For example, the drone 402 may cast a net or a bag on the ground (e.g., forming a 3-foot circle on the ground) next to user 404. The user 404 may place the item in the net or bag. In another embodiment, drone 402 may project with lights an electronic delivery zone 410 or pickup zone on the ground for the user 404 to place the item in. Once the user 404 places the item in the container 408, or delivery zone 410, the user 404 may notify the drone 402 with a gesture, or device 406, that the item is ready to be picked up. Drone 402 may perform an image or object recognition to validate the item being delivered. In an embodiment, the drone 402 may measure the weight and dimensions of the item to confirm the item is within operating guidelines. Drone 402 may use cameras and depth sensors to measure the dimensions of the item. In some implementations, a weight sensor on the container 408 measures the weight of the item. Upon successful validation, the drone 402 may pick up container 408 containing the item and deliver the item to the intended recipient or location.

In an embodiment, the drone 402 may have access to user 404 phone or social media contacts. To confirm the identity of the recipient, the drone 402 may prompt the user 404 to present a picture of the recipient for confirmation. In some instances, when no match is found, the drone 402 may request the user 404 to provide additional information about the identity of the recipient (e.g., address, phone number or picture). Drone 402 may perform facial recognition, vocal patterns or other demographics to identify the recipient. In another embodiment, the drone 402 may require a digital signature from the recipient.

In another embodiment, the drone 402 may deliver the item to the recipient at their address. In another embodiment, user 404 may request delivery confirmation of the item. Drone 402 may interface with nearby audio devices to ask a person to come out and accept the package.

In some cases, the recipient may be unavailable to receive the item at the delivery location. In an embodiment, the recipient may choose to summon an additional drone to accept the item and acknowledge receipt. In another embodiment, the drone may leverage a neighborhood watch to locate the recipient and deliver the item. If the neighborhood watch is unable to locate the recipient, the drone 402 may request other drones to help locate the recipient by sending them a picture of the recipient.

Figure 5:
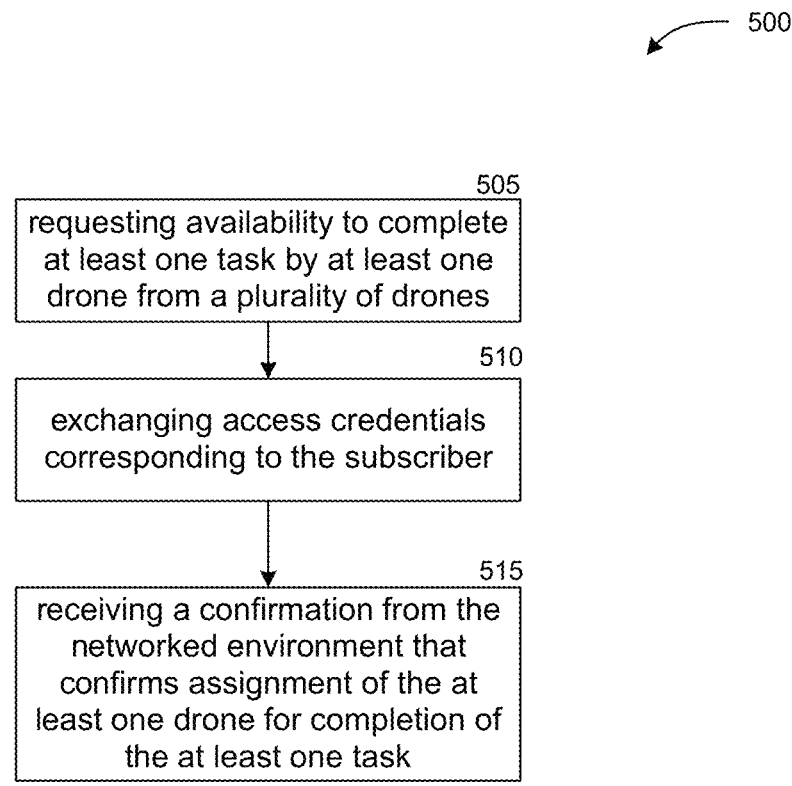
FIG. 5 is a flow diagram of an exemplary process for drones operating within a network environment, according to an embodiment.

FIG. 5 illustrates an embodiment of process 500 for drones operating within a network environment. At step 505, a mobile device, operating within a networked environment and corresponding to a subscriber, may request availability to complete at least one task by at least one drone from a plurality of drones. At step 510, the mobile device may exchange, with a server in the network environment, access credentials corresponding to the subscriber. At step 515, the mobile device may receive a confirmation from the networked environment that confirms assignment of the at least one drone for completion of the at least one task. When the drone arrives at the location to perform the task, the mobile device may confirm the identity of the subscriber with a digital signature. In an embodiment, the mobile device may send a location corresponding to the task. In another embodiment, the mobile device may request a wireless connection at a location corresponding to the subscriber.

Figure 6:
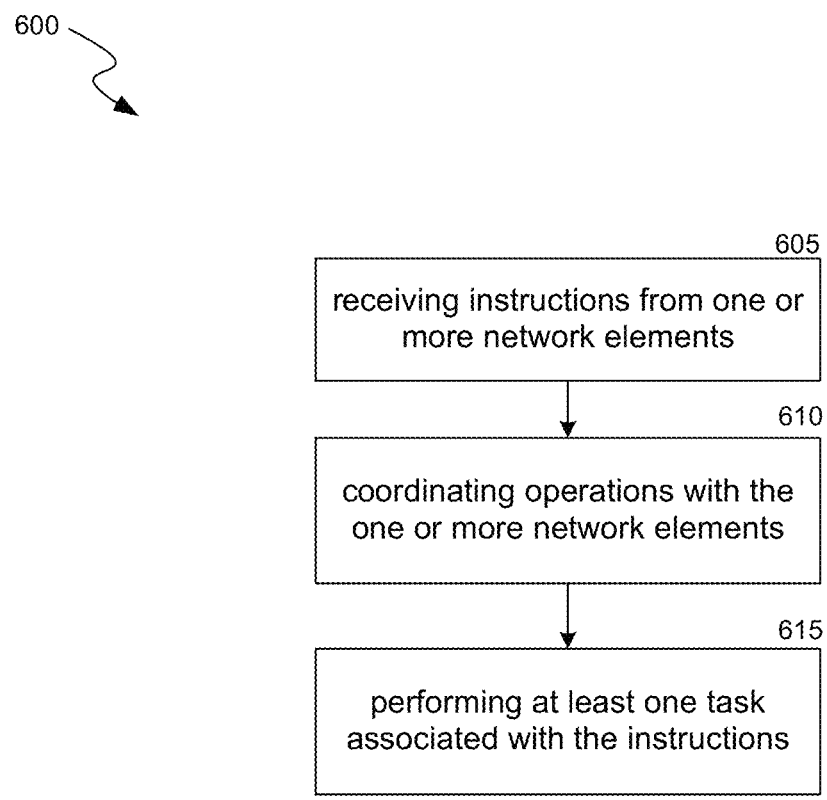
FIG. 6 is a flow diagram of an exemplary process for drones operating within a network environment, according to an embodiment.

FIG. 6 illustrates an embodiment of process 600 for drones operating within a network environment. A plurality of drones may operate within a networked environment. At step, 605, a drone may receive instructions from one or more network elements. At step 610, the drone may coordinate operations with the one or more network elements. At step 615, the drone may perform at least one task associated with the instructions. In an embodiment, the drone may deliver a container to a first location and perform object recognition to validate an object of a subscriber being delivered to a second location. The drone may measure the weight and dimensions of the object to confirm the object is within operating guidelines. After verifying the object is within operating guidelines, the drone may transport the container containing the object to the second location. In another embodiment, the drone may navigate to a location, whereby a visual line of sight from a wireless communication tower to the at least one drone is provided. The drone may provide a wireless connection at the location to at least one mobile device corresponding to a subscriber based on the visual line of sight to the wireless communication tower. In another embodiment, the drone may detect a gesture or verbal communication from the subscriber and navigate to a location whereby a visual line of sight to the subscriber is provided. The drone may perform the task based on the instructions from a server. In another embodiment, the drone may identify the subscriber based on facial recognition or vocal patterns.

Figure 7:
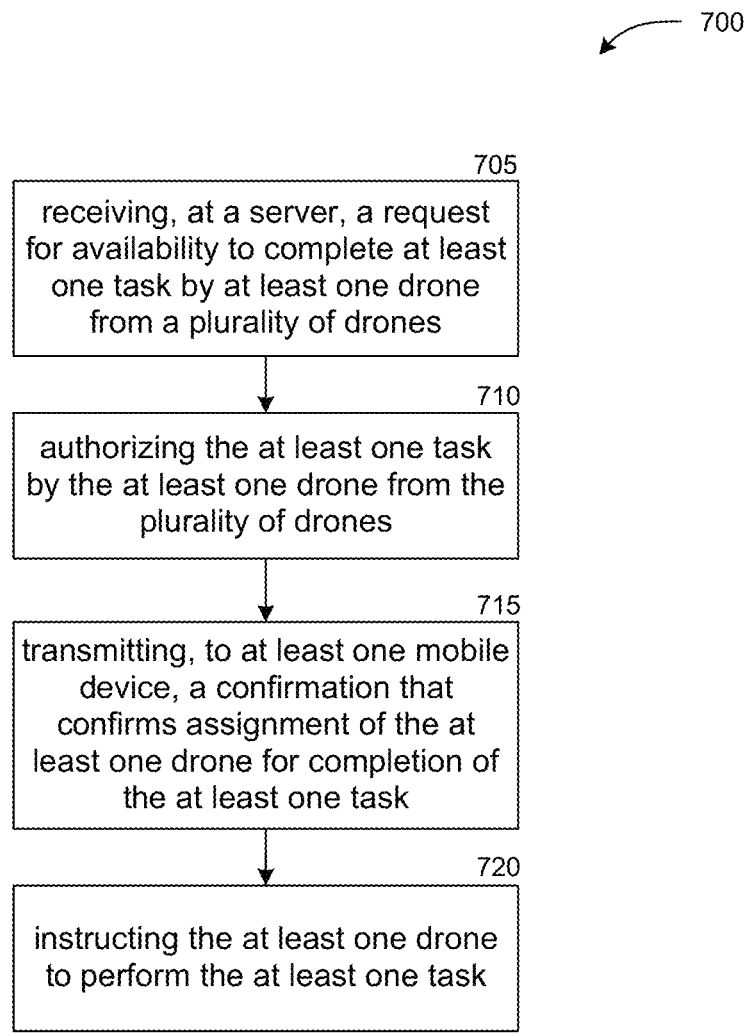
FIG. 7 is a flow diagram of an exemplary process for drones operating within a network environment, according to an embodiment.

FIG. 7 illustrates an embodiment of process 700 for drones operating within a network environment. At step 705, a server may receive a request for availability to complete at least one task by at least one drone from a plurality of drones. At step 710, the server may authorize the at least one task by the at least one drone from the plurality of drones. At step 715, the server may transmit, to at least one mobile device, a confirmation that confirms assignment of the at least one drone for completion of the at least one task. At step 720, the server may instruct the at least one drone to perform the at least one task.

Figure 8:
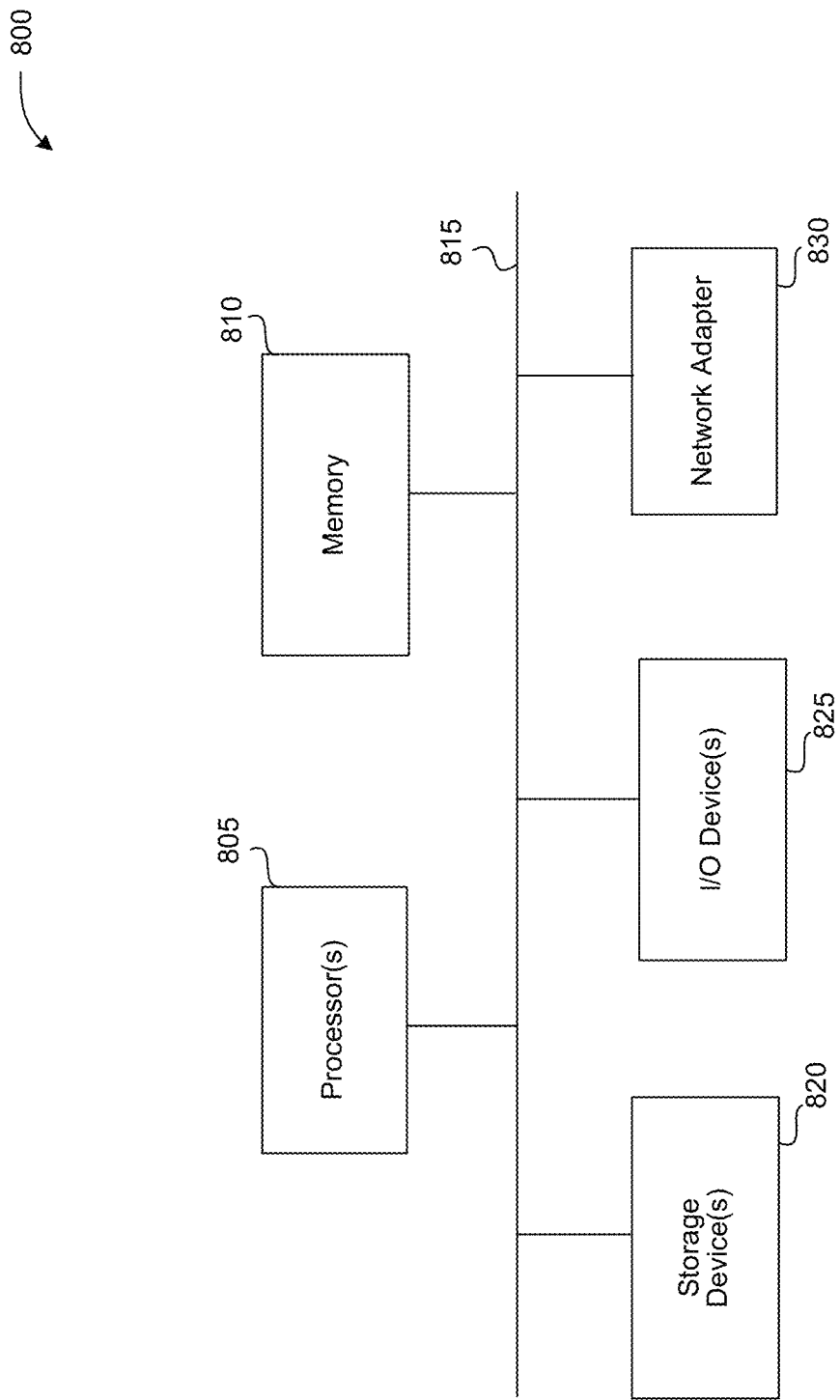
FIG. 8 is a block diagram of a processing system that can implement operations of the disclosed embodiments.

FIG. 8 is a block diagram of a computer system as may be used to implement features of the disclosed embodiments. The computer system 800 may be used to implement any of the entities, components or services depicted in the examples of the foregoing figures (and any other components described in this specification). The computer system 800 may include one or more central processing units ("processors") 805, memory 810, input/output devices 825 (e.g., keyboard and pointing devices, display devices), storage devices 820 (e.g., disk drives), and network adapters 830 (e.g., network interfaces) that are connected to an interconnect 815. The interconnect 815 is illustrated as an abstraction that represents any one or more separate physical buses, point to point connections, or both connected by appropriate bridges, adapters, or controllers. The interconnect 815, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 810 and storage devices 820 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 810 can be implemented as software and/or firmware to program the processor(s) 805 to carry out actions described above. In some embodiments, such software or firmware may be initially provided to the computer system 800 by downloading it from a remote system through the computer system 800 (e.g., via network adapter 830).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A method comprising:
   sending, by a user device, a request for at least one drone to complete at least one task, wherein the at least one task includes the at least one drone providing a wireless connection to the user device;
   receiving, by the user device, a confirmation that confirms assignment of the at least one drone for completion of the at least one task;
   sending, to the at least one drone, a location of the user device, wherein the at least one drone provides a visual line of sight from at least one wireless communication source to the location of the user device; and
   receiving, by the user device, the wireless connection from the at least one wireless communication source via the at least one drone.

2. The method of claim 1, further comprising:
   providing, to the at least one drone, a digital signature to identify a user associated with the user device.

3. The method of claim 1, further comprising:
   sending, by the user device, an object request for an object be delivered to the location of the user device.

4. The method of claim 1, further comprising:
   sending, by the user device, a communication to submit a fee for a transaction associated with the at least one task.

5. The method of claim 1, further comprising:
   sending, by the user device, a connection request for the wireless connection; and
   receiving, from at least one server, an authorization for the at least one drone to fulfill the connection request.

6. The method of claim 1, wherein the at least one drone detects a gesture or verbal communication from a user associated with the user device.

7. The method of claim 1, wherein the at least one task comprises electrical charging to the user device, taking a photo of a user associated with the user device, or monitoring a person.

8. A system comprising:
   one or more processors; and
   one or more memories storing instructions that, when executed by the one or more processors, cause the system to perform a process comprising:
   sending, by a user device, a request for at least one drone to complete at least one task, wherein the at least one task includes the at least one drone providing a wireless connection to the user device;
   receiving, by the user device, a confirmation that confirms assignment of the at least one drone for completion of the at least one task;
   sending, to the at least one drone, a location of the user device,
   wherein the at least one drone provides a visual line of sight from at least one wireless communication source to the location of the user device; and
   receiving, by the user device, the wireless connection from the at least one wireless communication source via the at least one drone.

9. The system according to claim 8, wherein the process further comprises:
   providing, to the at least one drone, a digital signature to identify a user associated with the user device.

10. The system according to claim 8, wherein the process further comprises:
    sending, by the user device, an object request for an object be delivered to the location of the user device.

11. The system according to claim 8, wherein the process further comprises:
    sending, by the user device, a communication to submit a fee for a transaction associated with the at least one task.

12. The system according to claim 8, wherein the process further comprises:
    sending, by the user device, a connection request for the wireless connection; and
    receiving, from at least one server, an authorization for the at least one drone to fulfill the connection request.

13. The system according to claim 8, wherein the at least one drone detects a gesture or verbal communication from a user associated with the user device.

14. The system according to claim 8, wherein the at least one task comprises electrical charging to the user device, taking a photo of a user associated with the user device, or monitoring a person.

15. A non-transitory computer-readable medium storing instructions that, when executed by a computing system, cause the computing system to perform operations comprising:
    sending, by a user device, a request for at least one drone to complete at least one task, wherein the at least one task includes the at least one drone providing a wireless connection to the user device;

receiving, by the user device, a confirmation that confirms assignment of the at least one drone for completion of the at least one task;

sending, to the at least one drone, a location of the user device, wherein the at least one drone provides a visual line of sight from at least one wireless communication source to the location of the user device; and receiving, by the user device, the wireless connection from the at least one wireless communication source via the at least one drone.

16. The non-transitory computer-readable medium of claim 15, wherein the operations further comprise:

providing, to the at least one drone, a digital signature to identify a user associated with the user device.

17. The non-transitory computer-readable medium of claim 15, wherein the operations further comprise:

sending, by the user device, an object request for an object be delivered to the location of the user device.

18. The non-transitory computer-readable medium of claim 15, wherein the operations further comprise:

sending, by the user device, a communication to submit a fee for a transaction associated with the at least one task.

19. The non-transitory computer-readable medium of claim 15, wherein the operations further comprise:

sending, by the user device, a connection request for the wireless connection; and receiving, from at least one server, an authorization for the at least one drone to fulfill the connection request.

20. The non-transitory computer-readable medium of claim 15, wherein the at least one drone detects a gesture or verbal communication from a user associated with the user device, and wherein the at least one task comprises electrical charging to the user device, taking a photo of the user associated with the user device, or monitoring a person.

* * * * *